(12) United States Patent
Notenbomer

(10) Patent No.: US 6,439,164 B1
(45) Date of Patent: Aug. 27, 2002

(54) COMPOSTING STRUCTURE

(75) Inventor: Robert W. Notenbomer, Medicine Hat (CA)

(73) Assignee: Pure Lean Hogs Inc., Medicine Hat (CA)

( * ) Notice: Subject to any disclaimer, the term of this patent is extended or adjusted under 35 U.S.C. 154(b) by 0 days.

(21) Appl. No.: 09/837,553

(22) Filed: Apr. 19, 2001

Related U.S. Application Data

(63) Continuation-in-part of application No. 09/774,883, filed on Feb. 1, 2001.

(51) Int. Cl.[7] .............................. A01K 1/01; A01K 1/02; C05F 11/08
(52) U.S. Cl. ............................. 119/447; 119/450; 71/9
(58) Field of Search ................................. 119/436, 447, 119/450, 451; 71/9

(56) References Cited

U.S. PATENT DOCUMENTS

| 4,708,294 A | * | 11/1987 | Endom | 119/450 |
| 4,788,936 A | | 12/1988 | Billings | 119/450 |
| 5,583,045 A | * | 12/1996 | Finn | 71/9 |
| 5,662,068 A | * | 9/1997 | Childs | 119/451 |
| 5,666,905 A | | 9/1997 | Mackin et al. | 119/448 |
| 5,832,873 A | | 11/1998 | Tu | 119/447 |
| 5,911,195 A | | 6/1999 | Tripp et al. | 119/450 |
| 5,942,022 A | | 8/1999 | Bislev et al. | 71/9 |
| 6,010,551 A | | 1/2000 | Jonninen | 71/9 |

* cited by examiner

Primary Examiner—Charles T. Jordan
Assistant Examiner—Elizabeth Shaw
(74) Attorney, Agent, or Firm—Bennett Jones LLP

(57) ABSTRACT

A composting structure and process is described for a livestock operation. The structure handles manure and treats it over a continuous 25 to 30 day process to produce compost therefrom. The structure includes a elongate walled area into which manure is piled, aerated and mixed while it is moved toward an output end. The structure is sized to handle 25 to 30 days worth of manure from the livestock operation which it services. The aeration is provided by an in-floor system of tubes arranged in zones so that the amount of air injected in the various zones can be selected.

13 Claims, 5 Drawing Sheets

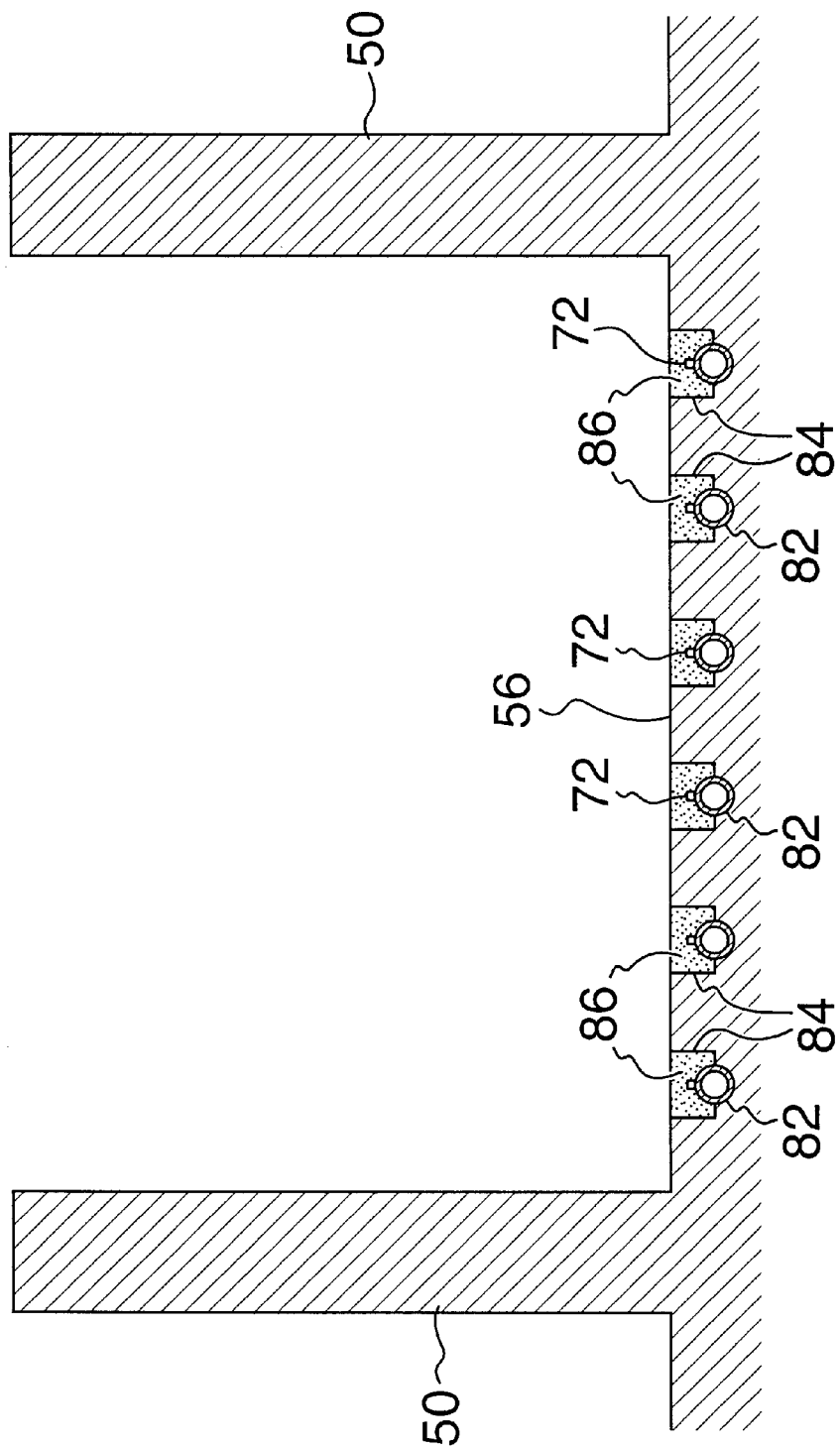

COMPOSTING STRUCTURE

This application is a CIP of U.S. application Ser. No. 09/774,883, filed Feb. 1, 2001.

FIELD OF THE INVENTION

The present invention is directed to a composting structure and in particular to a structure for composting materials in a continuous process.

BACKGROUND OF THE INVENTION

Livestock operations create a tremendous amount of waste. This waste is mostly in the form of manure, but can also be animal carcasses and bedding materials.

Where manure is formed of wet solid materials, generally this material is piled up to compost. However, the resulting piles are unsightly and create an objectionable odour. In addition, it is very difficult to control the composting process taking place in the pile because of exposure to the elements and inadequate mixing and, thus, the material resulting from the composting process sometimes still contains a bad odour or hazardous bacteria.

Animal carcasses cannot be handled by most livestock facilities and must be transported offsite for rendering.

SUMMARY OF THE INVENTION

A composting structure has been invented that effectively handles manure waste and animal carcasses. The composting structure handles manure waste in a continuous manner such that no waste need be stored and all waste can be introduced directly to the structure.

In one aspect of the present invention, there is provided a composting structure comprising: a pair of substantially parallel walls, a floor between the walls, an open input end to the floor between the walls and an open output end from the floor between the walls, a plurality of tubes to inject air from the floor between the walls, the tubes forming zones along the floor, each zone having an air flow therethrough that is selectable relative to flow through adjacent zones.

In one embodiment, the composting structure further comprises a long axis extending parallel with the walls and the zones extend substantially perpendicular to the long axis such that materials passing through the composting structure from the input end to the output end will pass through each of the zones.

The floor can be defined as a surface of granular materials in a pit and the tubes can be arranged in the granular materials. Alternately, the floor is solid and the tubes are imbedded in the surface of the floor.

The composting structure can include a blower to convey air through the tubes. The blower can feed air to each zone and a valve is positioned between each zone and the blower to control the flow of air into that zone.

In one embodiment, a turning device is supported between the walls and moveable therealong by a moving means, the turning device is extendable between the walls to a position just above the floor. For example, the turning device is supported and moved by a pair of wheels riding on the upper surface of the walls.

In a preferred embodiment, the input end and/or the output end is accessible by a tractor for transporting materials to and from the floor.

In accordance with another broad aspect of the present invention, there is provided a process for composting manure, the process comprising: providing a composting structure including a pair of substantially parallel walls, a floor between the walls, an open input end to the floor between the walls and an open output end from the floor between the walls, a plurality of tubes to inject air from the floor between the walls, the tubes separated into zones along the floor, each zone having a controllable air flow therethrough and selectable relative to flow through adjacent zones; loading manure onto the floor at the input end; moving the manure toward the output end; and aerating the manure by injecting air thereto from the tubes.

In one embodiment of the process, the tubes are separated into a first zone adjacent the input end and a second zone adjacent the output end and the process further comprising selecting the first zone to inject more air to the manure than the second zone. In another embodiment, the temperature of the manure is monitored and air is injected to the pile to maintain the manure above a temperature of 50° C.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings:

FIG. 5 is a sectional view through another composting structure according to the present invention.

DETAILED DESCRIPTION OF THE PREFERRED EMBODIMENTS

Figure 1:
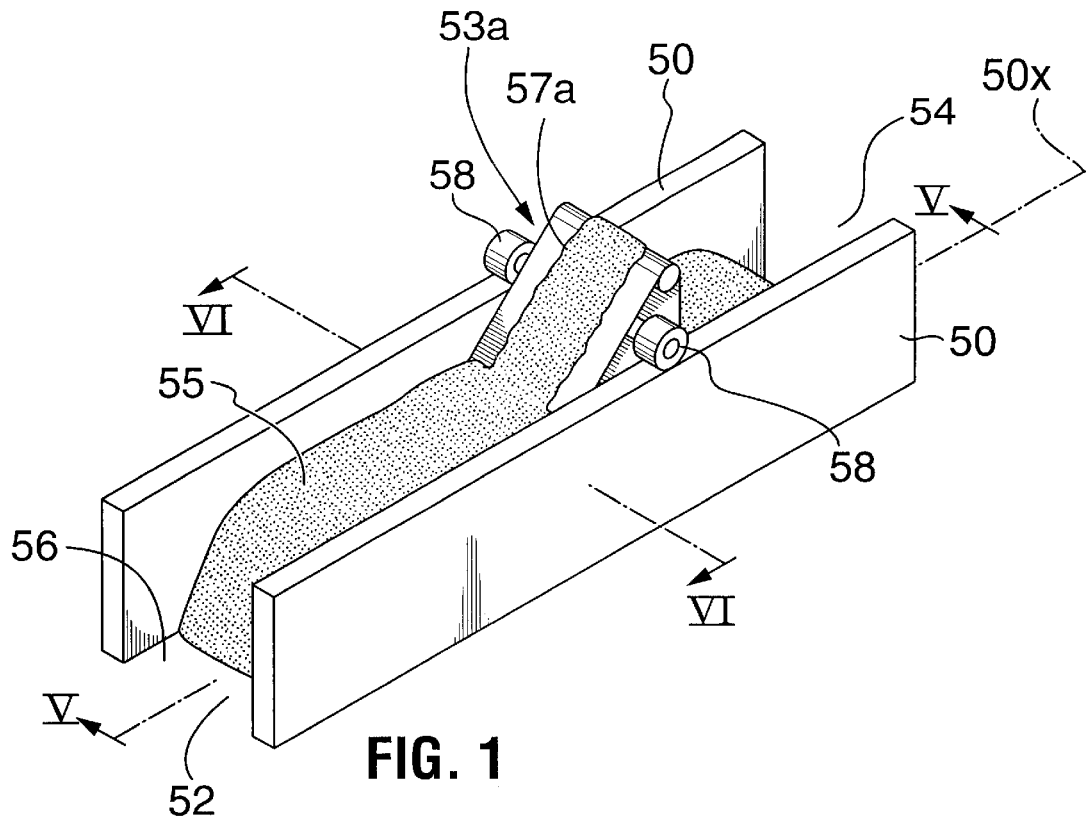
FIG. 1 is a perspective view of a composting structure according to the present invention.
Figure 2:
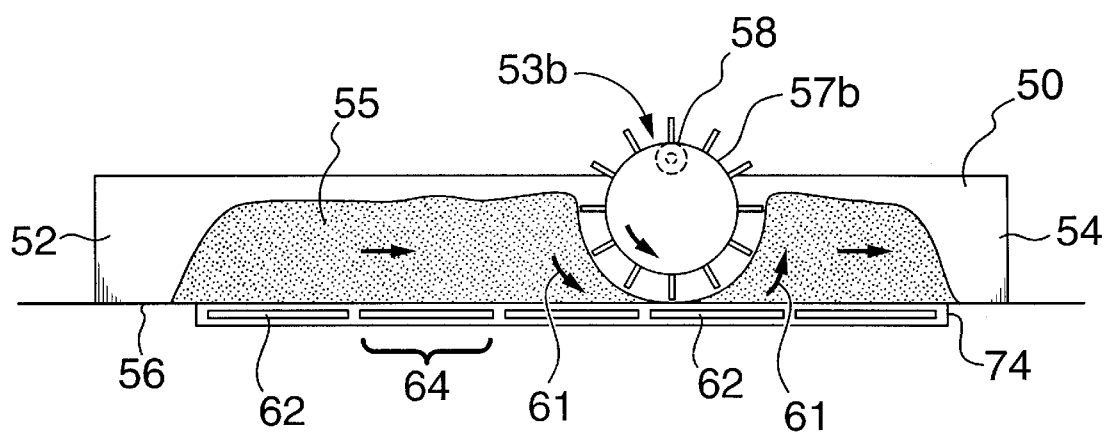
FIG. 2 is a sectional view along line V—V of FIG. 1 with another kind of turning device.
Figure 3:
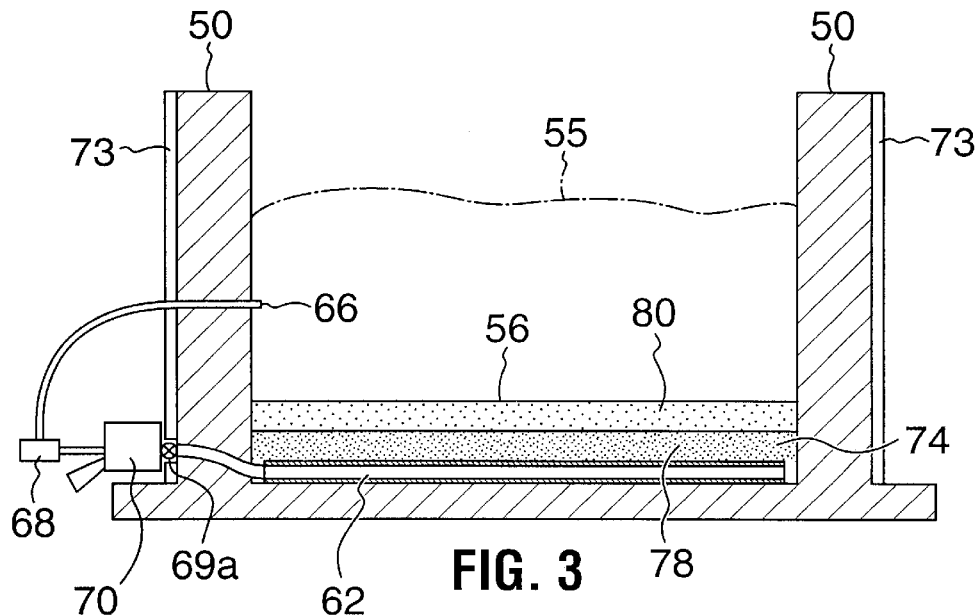
FIG. 3 is a sectional view along line VI—VI of FIG. 1.

A composting structure has been invented to efficiently handle the manure generated from a livestock operation. The structure is shown in FIGS. 1 to 5. This structure is preferably contained in an enclosure to avoid interference by precipitation and wind and to keep the livestock operation clean and substantially odor-free. While the term manure is used herein to describe the material handled by the compost structure, it is to be understood that the material handled by the composter can be livestock manure or solids from waste water treatment, dry or sticky manure, sticky manure-soiled fibrous materials or organic solids or mixtures of these sticky materials with dry manure, fibrous materials or animal carcasses. These materials, after passing through the structure will become nutrient-rich compost suitable for use as a potting soil or a soil supplement.

Large sized items like carcasses must be mixed with finer materials for proper processing. In particular, pig carcasses can be handled when mixed with finer materials such as manure in ratios of at most 1.5 carcasses per tonne of manure. The nature of the composter is such that the carcass, once deposited into the composter will begin to break down in the first day so that it can be processed with ease.

The moisture content of the overall mixture to be processed should be about 70 to 90% moisture per volume. While measurements can be made to determine moisture content, a qualitative measure of the manure moisture content can be made. In particular, suitable moisture content is achieved when a major portion of the manure is sticky but not saturated with liquid such that applying pressure by hand squeezing results in a formed mass but does not result in a release of liquid from the mixture.

The composting structure contains the manure and moves it through a composting process of 25 to 30 days. A shorter composting process may also be possible with the present composter. Air or oxygen is injected into the manure at regular periods to enhance composting. In particular, the structure has a pair of substantially parallel containment walls 50 extending between two open ends 52, 54. One end 52 is the manure input end and the other 54 is the compost output end. The manure pile 55 rests on floor 56 between the walls and is moved, manually or as by a machine 53a, 53b, from the input end to the output end along the structure's long axis 50x, over a 25 to 30-day period with aeration and mixing.

Preferably, the walls are relatively closely spaced when compared to their length. This allows the manure to be confined and piled up between the walls, facilitating mixing of the pile and process control. Since the process takes 25 to 30 days to produce compost, the walls must be long enough to accommodate 25 to 30 days of manure, while allowing for addition of manure to the input end each day. The amount of manure generated each day in any particular livestock operation will depend on the number of animals being raised. In one exemplary livestock operation, an amount of manure is added to the pile each day that adds 10 linear feet to the pile and the process takes 25 days. Thus the walls are about 250 feet long (10 feet per day×25 days). To accommodate and handle greater amounts of manure, the walls can be made longer or spaced apart to create more room therebetween. Alternately, where desired or necessary such as for example, where the moving machine cannot be widened any further or motor requirements for the machine are too high, more than one structure can be constructed for the livestock operation to be serviced. As will be appreciated, the walls must be formed to support the force of the pile of manure between them and to support the weight of a machine, if necessary. In one embodiment, the walls are formed of reinforced cement.

Mixing can be done by any suitable means such as, for example, manually. However, preferably machine 53a, 53b rides along walls 50 and digs into the pile to move the manure toward the output end, while causing mixing thereof. The machine includes wheels 58 to move it along the walls and a turning device 57a (FIG. 1), 57b (FIG. 2) that is moved along by the wheels. The wheels can ride directly on the upper wall surface or can be guided along rails etc. The wheels can be driven by various means to move along the wall such as a chain drive or a driven axle. As will be appreciated, wheels 58 can be replaced with other means such as skids that provide a support for and move the turning device or the turning device can be supported by a structure apart from the walls, such as the ceiling above the structure.

Turning device 57a or 57b is preferably sized to extend down between the walls and nearly to the floor surface so that substantially all of the manure between the walls is acted on by the turning device in one pass. The turning device can include, for example, one or more paddle wheel structures (FIG. 2), a conveyor belt (FIG. 1) or chain drive structure that starts at the output end and digs into the manure pile between the walls, pushing or lifting it toward output end 54, as indicated by the arrows 61. Once the turning device has moved through the pile, there will be a space at the input end into which the new manure can be loaded. This machine mixes and aerates the manure at the same time that it is moved. This can be done, for example, once each day or every second day during the composting process.

The turning device digs into the pile at the output end and moves toward the input end. Once it reaches the input end, the turning device is raised and the wheels move it above the pile along the walls until it reaches the output end again. The turning device is held at any convenient position until it is time to turn and mix the manure pile again.

Since the manure at the input end will contain bacteria that is not present in the compost at the output end, it is desirable to actuate the turning device to drop most, and preferably all, of the manure stuck to it prior to being moved back over the pile toward the output end. Thus, preferably after the turning device passes out of the pile at the input end, it is spun to loosen and remove materials therefrom over the output end. If the spinning process proves to be insufficient to prevent problematic contamination of the output end, then a rinsing step can be used. The rinsing step can be conducted manually or preferably, a device for releasing rinse water can be provided on the machine.

While the machine can be operated manually, preferably, it is at least in part automated. In particular, preferably the machine has a controller, for example via software. In a preferred automatic routine, the machine is controlled to start at a preselected time, for example at night, and being positioned at output end 54 the turning device is lowered into the pile and begins to turn slowly, so that the pile is moved behind it in a controlled way. Once the machine reaches a selected point along the wall the speed of rotation of the machine is increased to move the materials more rapidly. Since the materials can sometimes be very heavy, a sensor on the machine monitors the pressure on the machine and if the pressure on the rotor exceeds a selected level, for example, 1,800 psi, then the movement of the machine along the walls is slowed to prevent over loading the system. Sensors on the walls alert the controller that the machine has reached the input end and cause the turning device to be raised from the pile and spun to remove residual materials. The controller then reverses the machine down to the output end ready for another pass.

Aeration is provided from beneath the manure pile. Air supply pipes 62 are mounted on or in floor 56 between the walls. Preferably the air supply pipes are arranged in a plurality of zones 64 so that relatively more or less air can be injected into the pile at particular places within the composting structure. For example, preferably, greater amounts of air are injected into the pile adjacent the input end than the output end. The zones extend perpendicular to long axis 50x of the structure such that the manure passes over the zones as it is moved from the input end to the output end. In one embodiment, air is introduced to the pile through pipes 62 for two to four minutes, depending on the zone, every two hours. In one preferred embodiment, there are three zones (FIG. 4b) and from the input end to the output end, air is injected into the pile, as follows: aerating a zone about 70 feet long with a 3 horsepower blower, the zone closest to the input end is aerated for 15 minutes every hour, the next zone is aerated for 12 minutes every hour and the zone closest to the output end is aerated for 5 minutes every hour. Preferably, the air injection zones are recessed from the ends a selected amount, for example enough to accommodate at least one day of input manure and at least one day of output compost, in order that these areas of floor do not contain air injection apparatus and can be ridden thereover by equipment.

Figure 4A:
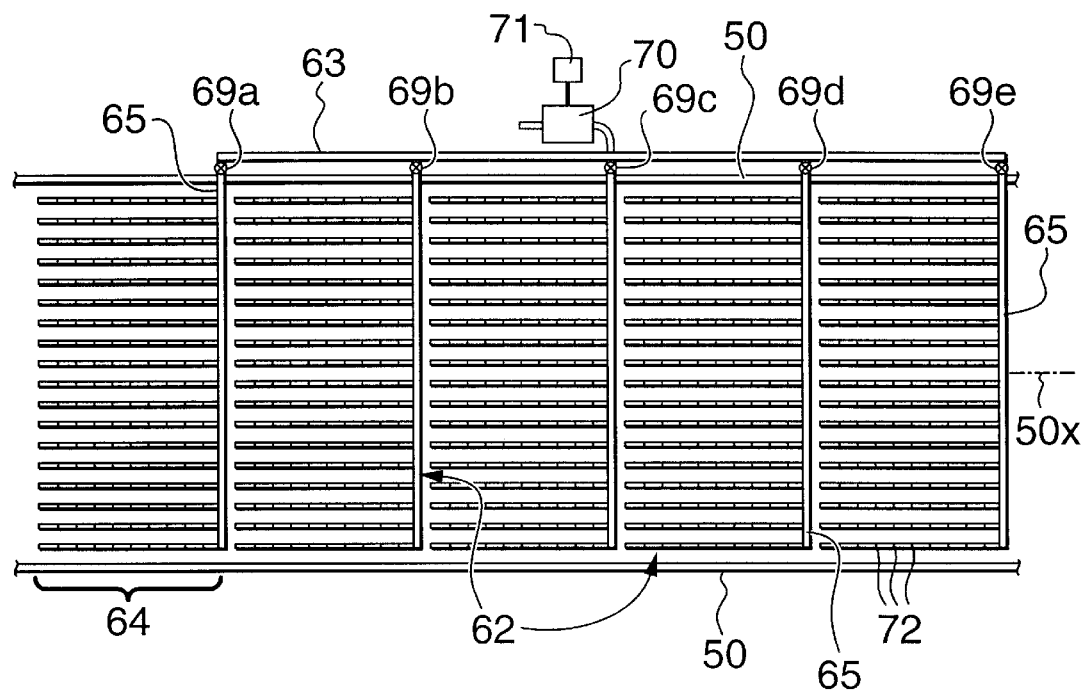
FIG. 4a is a schematic plan view of a composting structure according to the present invention.

A blower 70 provides air flow to pipes 62. There can be one or more blowers. In particular, there can be a blower for each zone or a blower can operate for more than one zone. As best shown in FIG. 4*a*, in one embodiment a blower 70 injects air into a main header 63 and thereafter into headers 65 for each of the various zones 64. Valves 69*a* to 69*e* are positioned between main header 63 and zone headers 65 to control the flow into each zone. The valves can be manually or automatically operable. In one embodiment, the blower is actuated to start up regularly via a controller 71 including a timer. The controller also drives valve 69*a* to open to allow air into the first zone and then after a selected period to close. Then the controller drives the second valve 69*b* to open and after a selected period to close and so on until all of the desired valves have been opened. Of course, more than one valve can be opened simultaneously, if the blower is sized to provide adequate air.

Figure 4B:
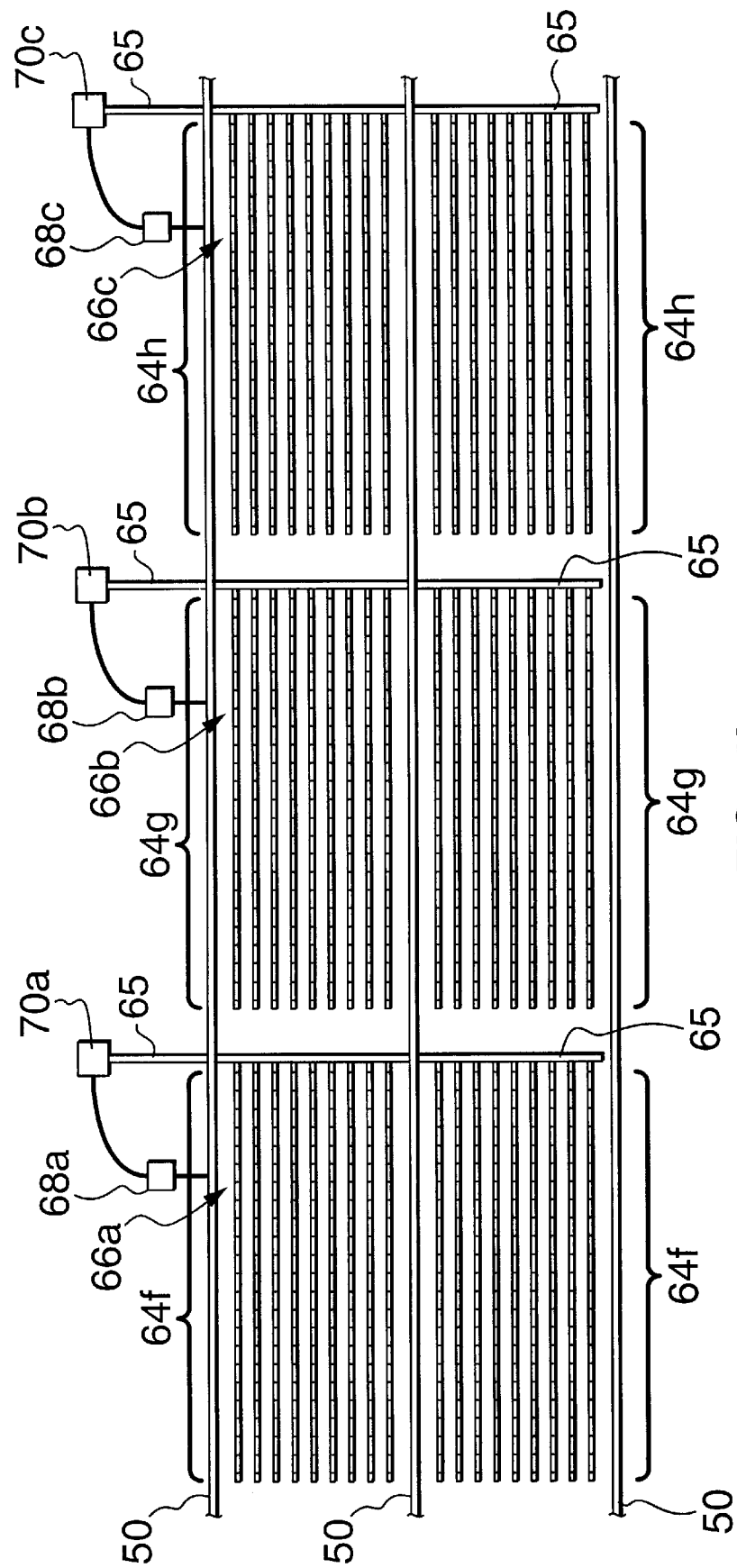
FIG. 4b is a schematic plan view of another composting structure according to the present invention.

In another embodiment shown in FIG. 4*b*, the composter includes two composting structures defined by three walls 50 and two floor areas therebetween. Each structure includes a correspondingly situated input area and output area (not shown at the ends of the walls) and three aeration zones 64*f* to 64*h*. To facilitate aeration a blower 70*a*, 70*b*, 70*c* is provided for each zone 64*f*, 64*g*, 64*h*, respectively. Each blower is controlled by a timer and provides aeration at selected periods to the two composting structures. Air is provided through headers 65 that pass into both structures. Thus, no valves are required and the two structures can be aerated simultaneously.

Aeration ensures that the composting bacteria continue to work in the pile. Composting occurs optimally when the manure temperature stays above 50° C. and preferably above 55° C. Thus, when the temperature drops below 50° C. it is indicative that the bacteria are not working effectively. Therefore, preferably, the temperature of the pile is monitored manually or using probes. Preferably, a temperature probe 66 (FIG. 3) is installed in the structure to determine pile temperature. While preferably, probe 66 would be positioned in the center of the pile, it must be positioned out of the way of turning device 57*a* or 57*b* and is thus positioned flush with or protruding slightly from the wall. A thermostat 68 is in communication with the probe to initiate operation of the aeration system, as by opening valves 69*a* and/or activating blower 70, when the temperature of the pile falls below a selected temperature for example 55° C. Aeration to bring up the temperature should be used in addition to any timed aeration.

In the particularly preferred embodiment of FIG. 4*b*, there is a temperature probe 66*a*, 66*b*, 66*c* and a thermostat 68*a*, 68*b*, 68*c* for each aeration zone such that the temperature can be monitored and aeration can be controlled in each zone independently.

Since, generally, the edge of the pile, where the probe is positioned, will be at a lower temperature than the center of the pile, adjustments should be made, as by obtaining a comparison of probe temperatures to center pile temperatures. To avoid heat loss through the wall and thereby reduce the temperature gradient from the center of the pile to the side edges, the outer surface of the wall can be covered with insulation or heat can be provided to the wall, as by hot water tubes extending therethrough. Also or alternately, a insulating member, such as a tarp (not shown), can be placed over the pile to avoid heat loss through the upper surface of the pile.

It is to be noted that the pile temperature can sometimes fall below 50° C. because of over-aeration or aeration using very cold air. Thus, when first using a composter according to the present invention, some adjustment may need to be made to avoid this occurrence. If a problem appears to be as a result of using very cold air, warmed air may be used, for example, from within the building or barn in which the composter is installed.

If material of the correct moisture content is supplied to the composter, it will seldom be necessary to add additional water to the pile. However, if necessary water can be added manually using a sprayer (not shown).

The air supply pipes are elongate with regularly spaced holes 72. Holes 72 can inject air upwardly or downwardly depending on the floor surface construction. While the desired number of holes/unit area will vary, in a preferred embodiment, the air supply pipes are spaced about one foot apart and the holes are spaced about one foot apart on each pipe. To reduce the cost of construction, the pipes can be spaced further apart, if desired, but it may be useful to increase the frequency of holes to ensure proper aeration.

Air supply pipes 62 are positioned out of the way of the turning device, below the effective surface of floor 56. In one embodiment shown in FIG. 3, pipes 62 are positioned in a gravel-filled pit 74 or gravel-filled channels or other coarse, non-compostable granular material below the effective floor surface between walls 50. To avoid getting gravel 78 in the manure, and therefore in the final compost, a layer of cedar bark mulch 80 can be laid above gravel 78. This cedar bark or gravel would be scraped down to a level below the turning device and effectively become an undisturbed floor surface over time. Any cedar bark entrained in the compost pile would be moved through the process and composted along with the manure.

With reference also to FIG. 5, the pipes 62, gravel 78 and mulch 80 can be replaced by pipes 82 mounted in cement channels 84 in floor 56. Pipes 82 include upwardly directed nozzles 72. This provides a more supportive surface than the gravel and, if properly engineered, allows equipment such as a tractor to be moved thereover for cleaning, etc. Channels 84 can be filled with pea gravel 86 or other coarse granular material to prevent manure from being caught therein.

The ends 52, 54 are open and at floor level so that the manure can be loaded into the input area and removed from the output area by riding in with a tractor.

In some livestock operations, traditionally all manure waste has been produced in a liquid form. In order to be handled by the composting structure of the present invention, the manure waste can be wet but should not be in liquid form. Thus, a farming process should be used in which solid waste is produced.

Figure 6:
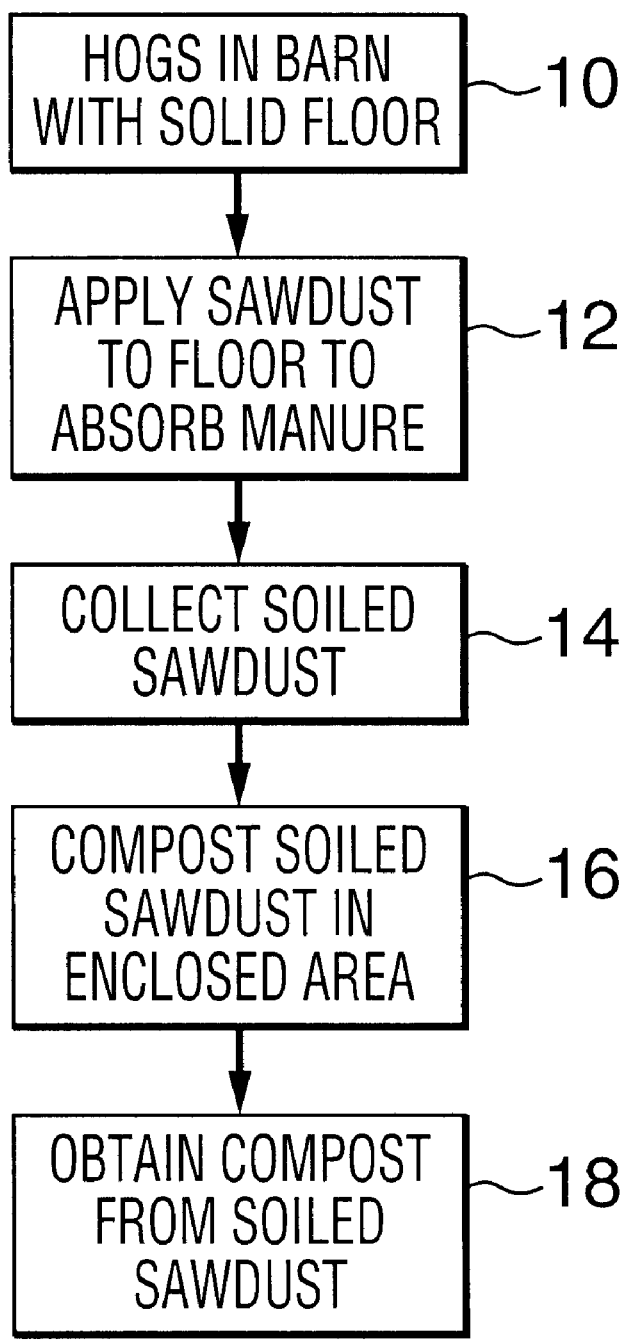
FIG. 6 is a flow chart showing a process for raising hogs useful with the composting structure of the present invention.

In hog farming operations it is particularly common to produce manure waste in the form of liquid that is pumped into lagoons for storage. Thus, a process for raising hogs as described in U.S. application Ser. No. 09/774,883 to the present applicant is particularly useful with the present invention. Referring to FIG. 6, the flow chart shows a process for raising hogs as described in the above-noted application. In the process, hogs are raised in a barn with a solid floor, shown in block 110. A solid floor creates a low stress, comfortable environment for the animals and has little or no effect on their feet. As will be appreciated, solid and liquid wastes, herein termed manure, that are dropped by the animals will accumulate on the solid floor. Fibrous, compostable material such as, for example, sawdust is applied 112 to the barn floor, as by blowing. The sawdust acts as an adsorbent for the animal waste and reduces odor in the barn, replacing the manure odor with a wood scent. Over time, when animals drop waste on the sawdust, a manure-soiled sawdust mixture is formed. The mixture is sticky and more easily removed from the floor, handled and moved than wet, untreated manure. Sufficient fibrous materials should be added such that the resultant manure-soiled mixture is sticky but not saturated with liquid. As noted previously, preferably applying pressure by hand squeezing should result in a formed mass but should not result in a release of liquid from the mixture.

Occasionally, the manure-soiled sawdust is collected, as indicated in block 114, from the barn floor. The frequency of removal will of course depend on a number of factors including the number of animals, the desired cleanliness of the barn and the amount of sawdust applied to the floor. For best results, the manure-soiled sawdust is removed from the floor at least once per day.

In a preferred embodiment, the barn environment is controlled such that the hogs tend to defecate in a selected area. This facilitates collection of the manure mixture. Environmental controls such as heat and drafts are particularly useful for controlling the area of the barn in which the hogs defecate. In addition, placement of feeders can also be used to control the areas in which the hogs tend to defecate. Hogs will tend to defecate in cool, drafty conditions and away from feeding areas and bedding areas, which can be defined by heating an area of the barn.

As indicated in block 116, after collection the manure-soiled fibrous materials are composted using the structure of the present invention to produce a nutrient-rich product substantially free of the harmful bacteria normally associated with manure.

It will be apparent that many other changes may be made to the illustrative embodiments, while falling within the scope of the invention and it is intended that all such changes be covered by the claims appended hereto.

The embodiments of the invention in which an exclusive property or privilege is claimed are defined as follows:

1. A composting structure comprising: a pair of substantially parallel walls, a floor between the walls, an open input end to the floor between the walls and an open output end from the floor between the walls, a plurality of tubes to inject air from the floor between the walls, the tubes forming zones along the floor, each zone having an air flow therethrough that is selectable relative to flow through adjacent zones.

2. The composting structure of claim 1 further comprising a long axis extending parallel with the walls and the zones extending substantially perpendicular to the long axis such that material passing through the composting structure from the input end to the output end will pass through each of the zones.

3. The composting structure of claim 1 wherein the floor is defined as a surface of granular materials in a pit and the tubes are arranged in the granular materials.

4. The composting structure of claim 1 wherein the floor is solid and the tubes are imbedded in the surface of the floor.

5. The composting structure of claim 1 wherein air is conveyed through the tubes by blower.

6. The composting structure of claim 5 wherein the blower feeds air to each zone and a valve is positioned between each zone and the blower to control the flow of air into that zone.

7. The composting structure of claim 1 further comprising a turning device supported between the walls and moveable therealong by a moving means, the turning device extendable between the walls to a position just above the floor.

8. The composting structure of claim 7 wherein the turning device is supported and moved by a pair of wheels riding on the upper surface of the walls.

9. The composting structure of claim 1 wherein the input end is accessible by a tractor for loading materials onto the floor.

10. The composting structure of claim 1 wherein the output end is accessible by a tractor for removing materials from the floor.

11. A process for composting manure, the process comprising: providing a composting structure including a pair of substantially parallel walls, a floor between the walls, an open input end to the floor between the walls and an open output end from the floor between the walls, a plurality of tubes to inject air from the floor between the walls, the tubes separated into zones along the floor, each zone having a controllable air flow therethrough and selectable relative to flow through adjacent zones; loading manure onto the floor at the input end; moving the manure toward the output end; and aerating the manure by injecting air thereto from the tubes.

12. The process of claim 11 wherein the tubes are separated into a first zone adjacent the input end and a second zone adjacent the output end and the process further comprising selecting the first zone to inject more air to the manure than the second zone.

13. The process of claim 11 further comprising monitoring the temperature of the manure and injecting air to the pile to maintain the manure above a temperature of 50° C.

* * * * *